United States Patent [19]

Yoneda et al.

[11] Patent Number: 5,313,147
[45] Date of Patent: May 17, 1994

[54] DIGITAL SERVO-CONTROL APPARATUS

[75] Inventors: Takao Yoneda, Nagoya; Tomonari Kato, Kariya; Toshihiro Yonezu, Nishio, all of Japan

[73] Assignee: Toyoda Koki Kabushiki Kaisha, Kariya, Japan

[21] Appl. No.: 764,825

[22] Filed: Sep. 24, 1991

[30] Foreign Application Priority Data

Sep. 27, 1990 [JP] Japan .................................. 2-259229

[51] Int. Cl.⁵ .............................................. G05B 11/32
[52] U.S. Cl. .................................... 318/569; 318/560; 318/603
[58] Field of Search ............... 318/608, 603, 602, 615, 318/616, 561, 562, 594, 610, 628, 569, 661, 560, 609

[56] References Cited

U.S. PATENT DOCUMENTS

| | | | |
|---|---|---|---|
| 4,200,827 | 4/1980 | Oswald | 318/594 |
| 4,243,923 | 1/1981 | Whitney et al. | |
| 4,282,468 | 8/1981 | Barker et al. | 318/608 |
| 4,453,116 | 6/1984 | Bose | 318/802 |
| 4,533,991 | 8/1985 | Georgis | 318/561 |
| 4,540,925 | 9/1985 | Jones | |
| 4,666,361 | 5/1987 | Kitabatake et al. | |
| 4,827,200 | 5/1989 | Ogura et al. | |
| 4,931,712 | 6/1990 | DiGiulio et al. | 318/562 |
| 4,940,924 | 7/1990 | Mizuno et al. | 318/560 |
| 5,062,064 | 10/1991 | Sagues et al. | 318/603 |
| 5,063,335 | 11/1991 | Baechtel et al. | 318/609 |
| 5,107,193 | 4/1992 | Iwashita | 318/610 |

FOREIGN PATENT DOCUMENTS

| | | |
|---|---|---|
| 0148269 | 7/1985 | European Pat. Off. |
| 0299080 | 1/1989 | European Pat. Off. |
| 0302943 | 2/1989 | European Pat. Off. |
| 0308510 | 3/1989 | European Pat. Off. |
| 2315116 | 1/1977 | France |

Primary Examiner—William M. Shoop, Jr.
Assistant Examiner—John W. Cabeca
Attorney, Agent, or Firm—Oblon, Spivak, McClelland, Maier & Neustadt

[57] ABSTRACT

A digital servo-control apparatus which controls the rotation of a servomotor on the basis of a digital position command value representative of a target position and a digital position feedback value output from a position detecting device. The apparatus comprises a device for calculating a feedforward value at intervals of a predetermined period on the basis of the amount of change of the position command value, a device for delaying the position command value by a period of time corresponding to an operation delay in the feedforward value calculating device, a device for calculating a velocity command value by adding the feedforward value to a deviation of the position feedback value from the position command value delayed by the delay device, and a device for driving the servomotor according to the velocity command value determined by the calculating device.

4 Claims, 10 Drawing Sheets

| PHASE Q OF MAGNETIC FIELD | VOLTAGE VECTORS |
|---|---|
| 0 | $V_6, V_1$ |
| 1 | $V_1, V_6$ |
| 2 | $V_6, V_1$ |
| ⋮ | ⋮ |
| 60 | $V_6, V_5$ |
| ⋮ | ⋮ |
| 120 | $V_4, V_5$ |
| ⋮ | ⋮ |
| 180 | $V_4, V_3$ |
| ⋮ | ⋮ |
| 240 | $V_2, V_3$ |
| ⋮ | ⋮ |
| 300 | $V_2, V_1$ |
| ⋮ | ⋮ |

Fig. 8

DIGITAL SERVO-CONTROL APPARATUS

BACKGROUND OF THE INVENTION

1. Field of the Invention

The present invention relates to a digital servo-control apparatus having feedforward function.

2. Description of the Prior Art

One type of servo-control apparatus that has analog feedforward function has heretofore been known.

In the analog feedforward control, the frequency of a command pulse is converted into a voltage, which is then added to the velocity command voltage and output to a servomotor driving circuit.

The conventional servo-control apparatus having the analog feedforward function suffers, however, from the problem that the feedforward value is delayed by a given time during the F/V conversion due to the time constant of hardware.

The above-described time lag (phase shift) causes a needless change of the command velocity. As a result, the servo system oscillates and chattering is generated on the machined surface of the workpiece, causing deformation of the finished configuration of the workpiece.

SUMMARY OF THE INVENTION

In view of the above-described problems of the prior art, it is an object of the present invention to prevent the generation of chattering on the machined surface of the workpiece which would otherwise be caused by the oscillation of the servo system, thereby improving the accuracy of the machined configuration of the workpiece.

To this end, the present invention provides a digital servo-control apparatus which controls the rotation of a servomotor on the basis of a digital position command value representative of a target position and a digital position feedback value output from position detecting means, comprising: means for calculating a feedforward value at intervals of a predetermined period on the basis of the amount of change of the position command value; means for delaying the position command value by a period of time corresponding to an operation delay in the feedforward value calculating means; means for calculating a velocity command value by adding the feedforward value to a deviation of the position feedback value from the position command value delayed by the delay means; and means for driving the servomotor according to the velocity command value calculated by the calculating means.

By virtue of the above-described arrangement, the output of the target position is delayed by a predetermined delay time by the delay means, and the feedforward value is added to a deviation of the position feedback value from the delayed target position and the resulting sum is output to the servomotor driving circuit.

Accordingly, even if there is an operation delay to calculate a feedforward value during feedforward control, the feedforward value is synchronized with the position command value representative of the target position, thus enabling suppression of the oscillation of the servo system.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DESCRIPTION OF THE EMBODIMENTS

The present invention will be described below by way of one specific embodiment and with reference to the accompanying drawings.

Figure 1:
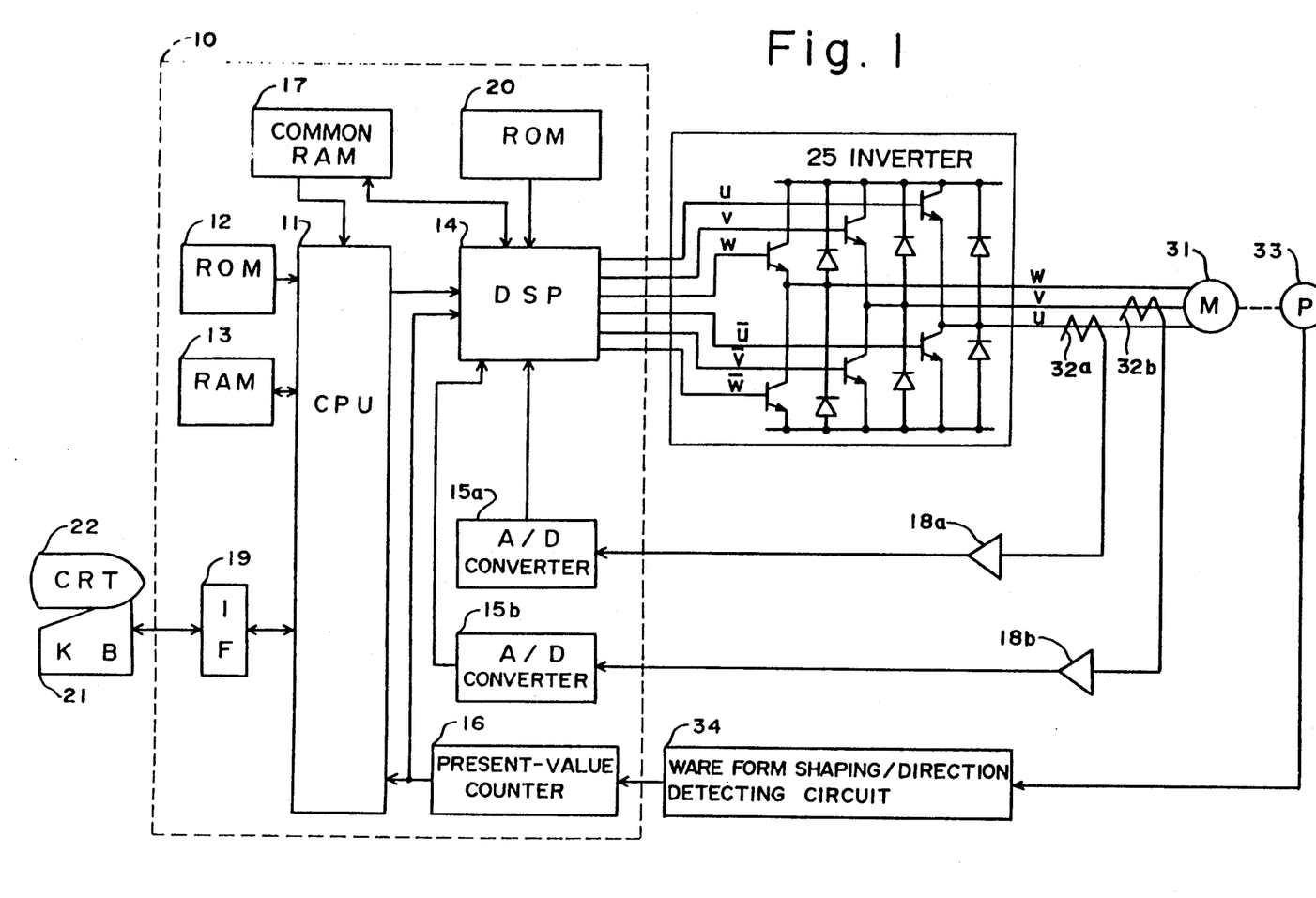
FIG. 1 is a block diagram showing the arrangement of a digital servo-control apparatus according to one specific embodiment of the present invention.

FIG. 1 is a block diagram showing the arrangement of a digital servo-control apparatus according to the present invention.

The digital servo-control apparatus 10 comprises a CPU 11, a ROM 12, a RAM 13, a digital signal processor (hereinafter referred to as "DSP") 14, a common RAM 17, A/D converters 15a and 15b, and a present-value counter 16. The CPU 11 is connected with a keyboard 21 and a CRT 22 through an interface 19.

The output of the DSP 14 is input to an inverter 25, which drives a servomotor 31 in response to the output signal from the DSP 14. The inverter 25 comprises two transistors connected in series for each phase. A synchronous motor is used as the servomotor 31. The load current to the servomotor 31 is controlled by the inverter 25 by means of PWM voltage control, so that the output torque is controlled.

The load currents of the phases u and v of the servomotor 31 are detected by CTs 32a and 32b and amplified by amplifiers 18a and 18b, respectively. The outputs of the amplifiers 18a and 18b are input to A/D converters 15a and 15b, in which these outputs are sampled at a predetermined period and converted into digital values. The sampled values are input to the DSP 14 as the feedback values of the instantaneous load currents.

The servomotor 31 is connected with a pulse encoder 33 to detect the present position thereof. The output of the pulse encoder 33 is connected to the present-value counter 16 through a wave form shaping/direction determining circuit 34.

The output signal from the pulse encoder 33, which is input to the present-value counter 16 through the wave form shaping/direction determining circuit 34, increments or decrements the value of the present-value counter 16. The value of the present-value counter 16 is read by the DSP 14 as the present-position feedback value and compared therein with a target value output from the CPU 11 to determine a position deviation. The DSP 14 calculates a target velocity value on the basis of the position deviation.

The present-position feedback value that is input to the DSP 14 is differentiated therein to obtain a velocity feedback value. The DSP 14 makes a comparison between the velocity feedback value and the target velocity value determined on the basis of the position deviation to obtain a velocity deviation and calculates a target current value on the basis of the velocity deviation.

The DSP 14 makes a comparison between the target current value and the feedback values of the load currents, which are detected by the CTs 32a and 32b through the amplifiers 18a and 18b and the A/D converters 15a and 15b, to obtain a current deviation. Then, an instantaneous current command value at that time is calculated on the basis of the present instantaneous current deviation, the cumulative instantaneous current deviation value and the target current value, that is, by proportional plus integral calculation. The instantaneous current command value is compared with a high-frequency triangular wave to generate a voltage control PWM signal for on/off controlling the transistors of each phase in the inverter 25. The voltage control PWM signal is output to the inverter 25 to drive the transistors of each phase in the inverter 25. The switching operation of the inverter 25 enables the load current of each phase to be controlled to the target current value.

The positioning of the servomotor 31 is completed when the CPU 11 decides that the output value from the present-value counter 16 has become equal to the target position value.

The load current values of the phases u and v sampled by the A/D converters 15a and 15b are dq-transformed by the DSP 14.

The digital servo-control apparatus in this embodiment comprises three feedback loops for position, velocity and current, as described above. As the order of feedback loops lowers, higher response is demanded. For example, in the lowest-order feedback loop, i.e., the current feedback loop, the sampling of data is executed at intervals of a period of 100 μs; in the velocity feedback loop, the sampling period is several times that of the current feedback loop; and in the position feedback loop, the sampling period is several times that of the velocity feedback loop. In this way, the three feedback loops execute respective processings synchronously.

Figure 2:
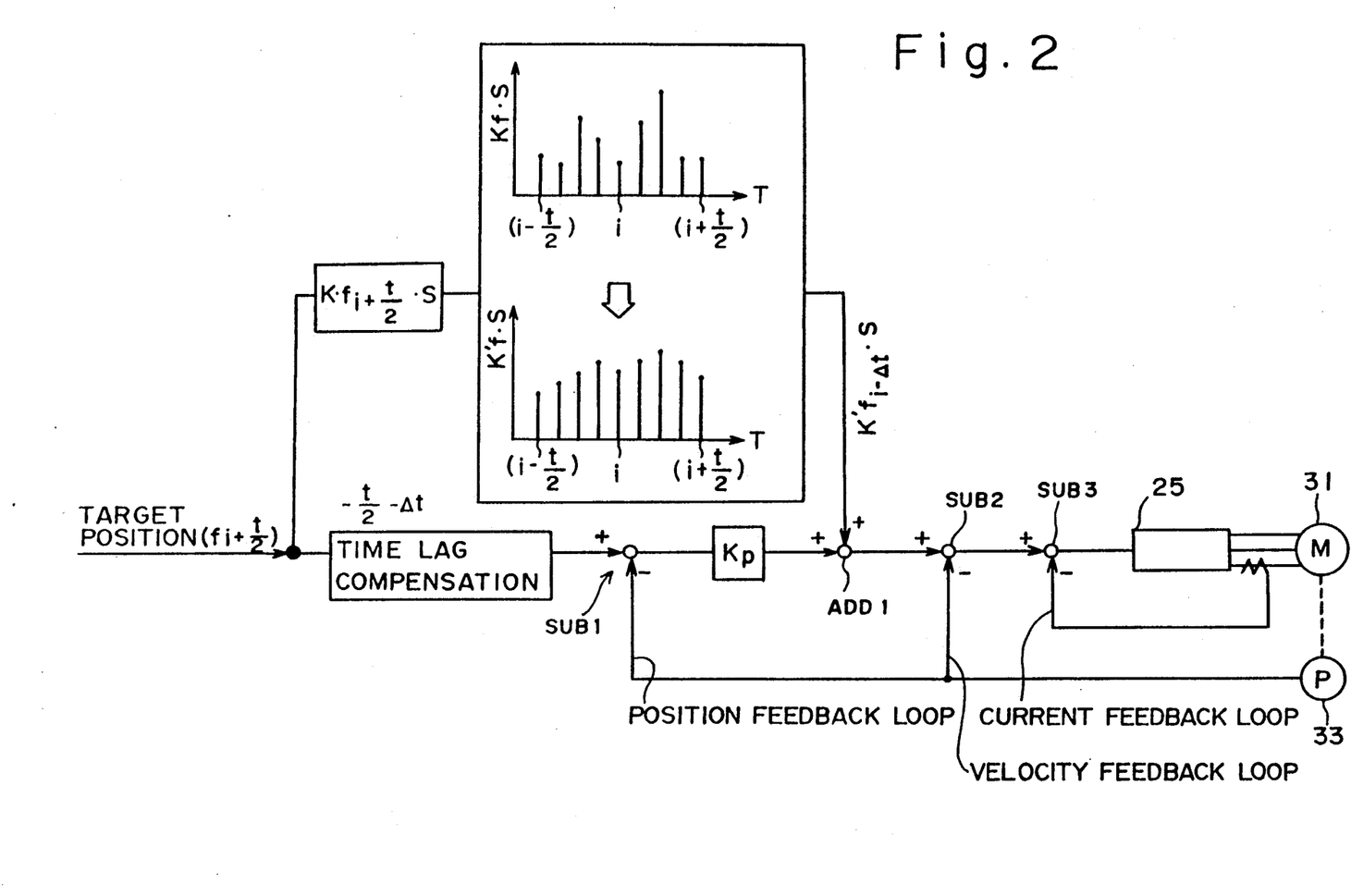
FIG. 2 is a block diagram showing the concept of the feedforward control with respect to three feedback loops for position, velocity and current in the apparatus of the embodiment.

FIG. 2 is a block diagram showing the concept of the feedforward control with respect to the three feedback loops for position, velocity and current in the apparatus of this embodiment, described above. In this figure, time $(i+t/2)$ is the present time, and time i is $t/2$ before the present time, while time $(i-t/2)$ is t before the present time.

At the present time $(i+t/2)$, the commanded target position $(f_{i+t/2})$ is differentiated by a differentiator S in the feedforward loop to obtain a feedforward value $(K \cdot f_{i+t/2} \cdot S)$ for the target velocity value at the present time with a feedforward gain K. Among the values obtained in this way, only data in a predetermined past time t is stored.

Next, the feedforward values (Kf·S), which are stored in a predetermined past time, i.e., in the period of time t from the time $(i-t/2)$ to the time $(i+t/2)$, are subjected to smoothing to obtain a feedforward value (K'f·S).

Then, a feedforward value $(K'f_{i-\Delta t}S)$ that is subjected to smoothing at a predetermined delay time $(i-\Delta t)$ is output to an adder ADD1 in the velocity feedback loop where it is added to a command value. It should be noted that $\Delta t$ is a delay time of feedback data in the position feedback loop.

In the meantime, the command target position is delayed by $\{(-t/2-\Delta t)\}$ by time lag compensation. Accordingly, the command target position that is added to a subtracter SUB1 is the target position $(f_{i-\Delta t})$ at the time $(i-\Delta t)$.

It should be noted that Kp is a position feedback loop gain.

Thus, the feedforward value at the delay time $(i-\Delta t)$ is output to the adder ADD1 and the target value at the delay time $(i-\Delta t)$ is output to the subtracter SUB1, thereby eliminating the phase shift (time lag) between the feedforward value and the velocity command value in the velocity feedback loop.

The operation of the apparatus in this embodiment will next be explained.

The program shown in FIGS. 3(a) to 3(d) is repeatedly executed by the DSP 14 at intervals of a predetermined minimum period.

Figure 3A:
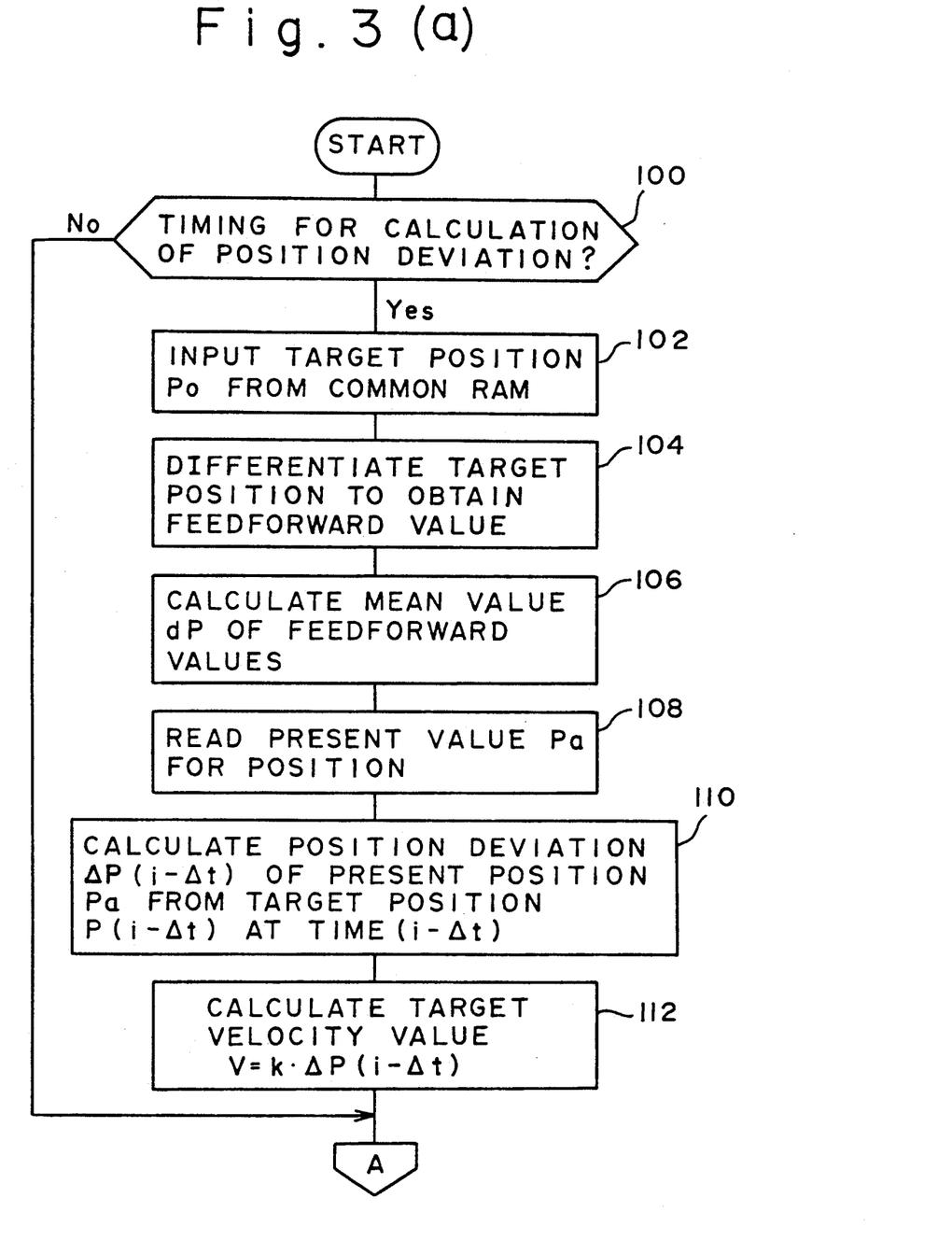
FIGS. 3(a) to 3(d) are flowcharts showing the processing procedure executed by a DSP used in the apparatus of the embodiment.

It is decided at Step 100 whether or not the present execution cycle is at the timing for calculating a position deviation. If YES, the process proceeds to Step 102, at which the target position $P_0$ commanded by the CPU 11 is input from the common RAM 17 and stored. Target positions in a predetermined past time t have been stored in the common RAM 17.

Next, the process proceeds to Step 104 of realizing feedforward value calculating means, at which the target position $P_0$ stored at Step 102 is differentiated to obtain a feedforward value. Feedforward values calculated in the predetermined past time t are stored in the common RAM 17. Each time a new feedforward value is generated, the oldest one is discarded.

Next, the process proceeds to Step 106 of realizing smoothing means, at which a mean value dP of the feedforward values calculated at Step 104 in the predetermined period of time t is calculated as a smoothing processing. The value dP is defined as a smoothed feedforward value at the time i (i.e., at the middle point of the period of time t). Smoothed feedforward values in the predetermined period of time t are stored in the RAM 17.

Next, the process proceeds to Step 108, at which the present value Pa for the position stored in the present-value counter 16 is read.

Next, a position deviation $\Delta P(i-\Delta t)$ of the present position Pa from the target position $P(i-\Delta t)$ at the time $(i-\Delta t)$ which is $f(t/2)$-,&t)) before the present time $(i+t/2)$ is calculated at Step 110. This value is obtained by interpolating values for P(i) and P(i−1) in the common RAM 17 with $\Delta t$.

Next, a target velocity value is calculated at Step 112 from a value that is proportional to the position deviation $\Delta P(i-\Delta t)$, that is, according to the following equation:

$$V = k \cdot \Delta P(i-\Delta t)$$

Figure 4:
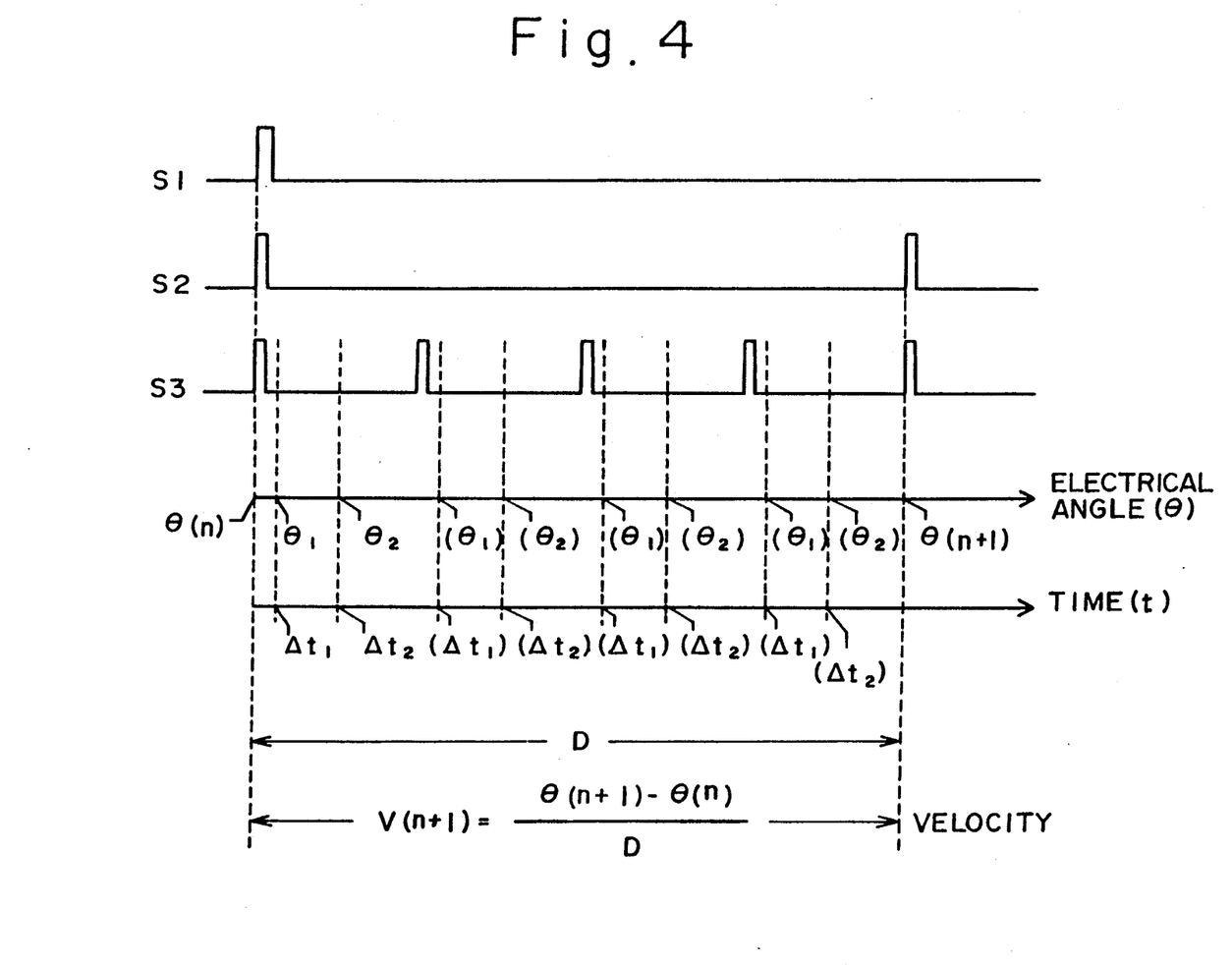
FIG. 4 is a timing chart showing the timing of the feedback control for position, velocity and current executed by the DSP.

This position feedback control is executed at the timing indicated by a signal S1 in FIG. 4.

Figure 3B:
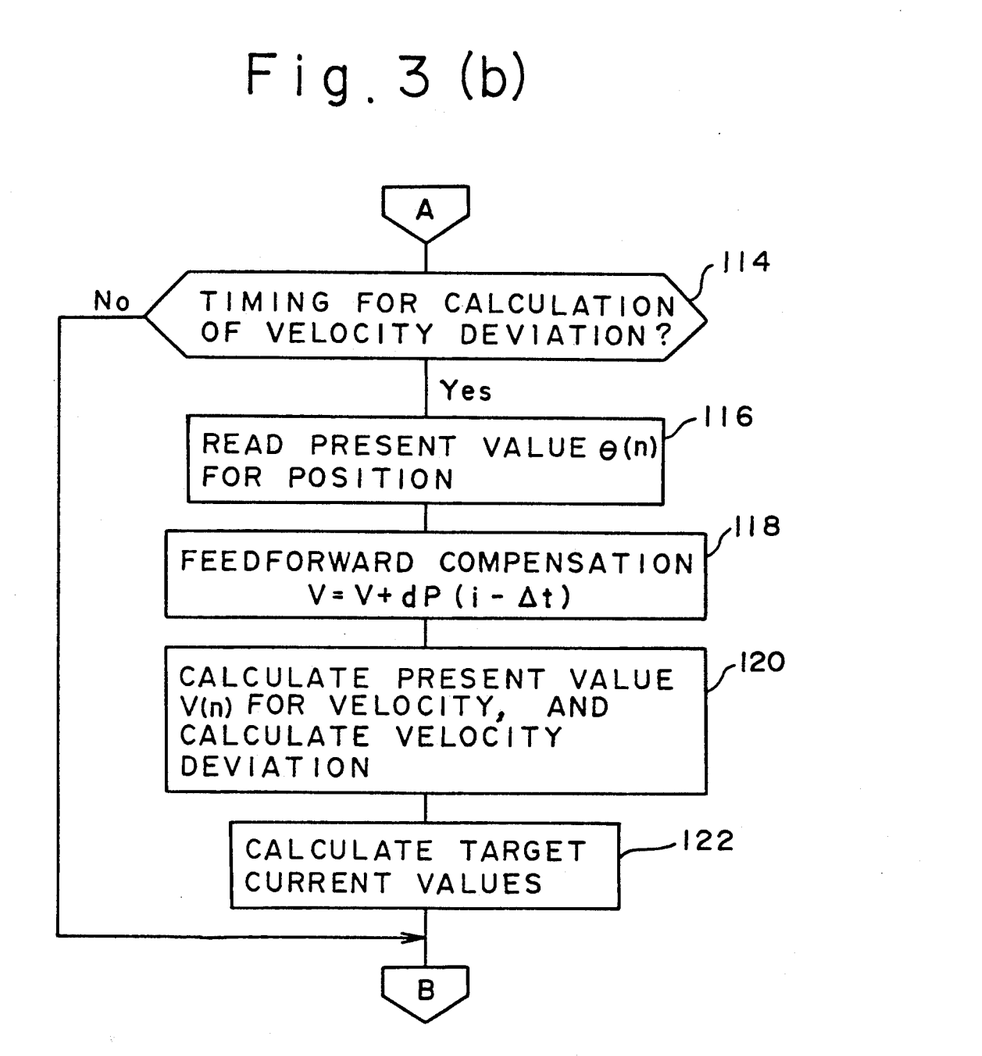

Next, it is decided at Step 114 whether or not the present execution cycle is at the timing for calculating a velocity deviation.

If YES is the answer at Step 114, the process proceeds to Step 116, at which the present value (electrical angle) $\theta(n)$ for position held in the present-value counter 16 is read.

Next, the process proceeds to Step 118, at which the feedforward value smoothed at the time $(i-\Delta t)$ is read out from the common RAM 17 and a target velocity value by feedforward control is determined as follows:

$$V = V + dP(i-\Delta t)$$

Next, a present value $V(n)$ for velocity in the present velocity control period is calculated at Step 120 from the present value (electrical angle) $\theta(n-1)$ for position read at the preceding timing for calculating a velocity deviation and the velocity control period D, according to the following equation:

$$V(n) = (\theta(n)\theta(n-1))/D \quad (1)$$

In addition, a deviation from the target velocity value set at Step 112, that is, a velocity deviation, is calculated.

Then, target current values for the d- and q-axis components are calculated at the subsequent Step 122 in accordance with the velocity deviation calculated. This velocity feedback control is executed at the timing indicated by a signal S2 in FIG. 4.

Figure 3C:
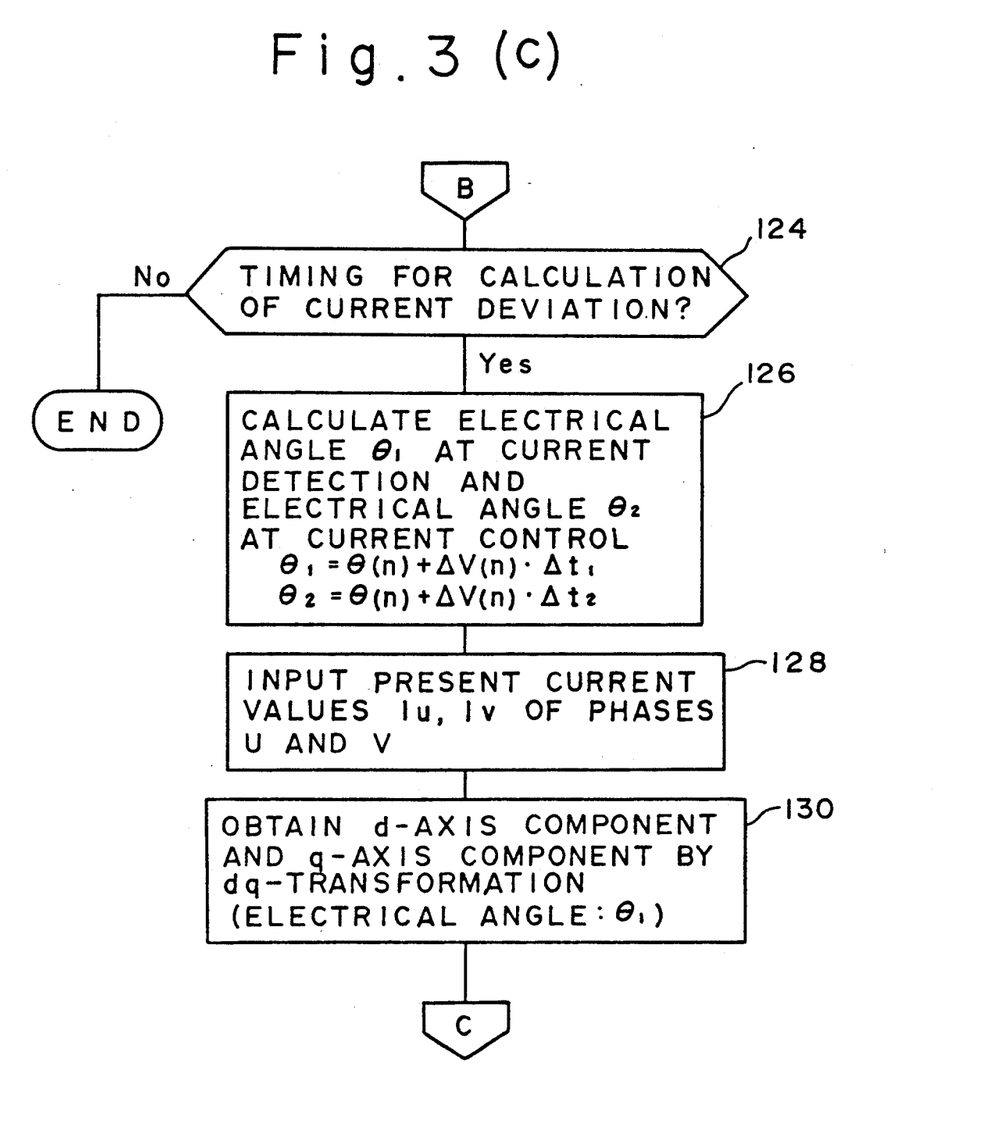

Next, it is decided at Step 124 whether or not the present execution cycle is at the timing for calculating a current deviation.

If YES is the answer at Step 124, the process proceeds to Step 126.

The processing carried out at Step 126 and those following it is current feedback control, which is executed at the timing indicated by a signal S3 in FIG. 4.

At Step 126, using the time $\Delta t_1$ for current detection in the subsequent Step 128, measured from the beginning of the current control period, and the time $\Delta t_2$ for controlling the load current, measured from the beginning of the current control period, the corresponding electrical angles, i.e., an electrical angle $\theta_1$ at the time of current detection and an electrical angle $\theta_2$ at the time of current control, are calculated by interpolation as follows:

$$\theta_1 = \theta(n) + \Delta V(n) \cdot \Delta t_1 \quad (2)$$

$$\theta_2 = \theta(n) + \Delta V(n) \cdot \Delta t_2 \quad (3)$$

The time $\Delta t_1$ and the time $\Delta t_2$ correspond to the electrical angles $\theta_1$ and $\theta_2$, respectively, as shown in FIG. 4.

Next, the process proceeds to Step 128, at which the present values Iu and Iv for the instantaneous load currents of the phases u and v are read from the A/D converters 15a and 15b.

Next, at Step 130, the present current values Iu and Iv are dq-transformed, and a d-axis component Id and a q-axis component Iq are calculated according to the following equations:

$$Id = \sqrt{2}\{Iu \cdot \sin(\theta_1 + 2\pi/3) - Iv \cdot \sin\theta_1\} \quad (4)$$

$$Iq = \sqrt{2}\{Iu \cdot \cos(\theta_1 + 2\pi/3) - Iv \cdot \cos\theta_1\} \quad (5)$$

As is well known, the dq coordinate system is such that the d-axis is in phase with the exciting magnetic field, while the q-axis is 90° (electrical angle) out of phase with the exciting magnetic field. The d-axis component represents the reactive component, while the q-axis component represents the active component.

Next, current command values Id* and Iq* for the d- and q-axis components at the present time are calculated at Step 132 by proportional plus integral calculation on the basis of the target current values for the d- and q-axis components set at Step 122.

Next, at Step 134, the current command values Id* and Iq* are subjected to inverse dq-transformation to obtain current command values Iu*, Iv* and Iw* for the respective phases according to the following equations:

$$Iu^* = \sqrt{2/3}\{Id^* \cdot \cos\theta_2 - Iq^* \cdot \sin\theta_2\} \quad (6)$$

$$Iv^* = \sqrt{2/3}\{Id^* \cdot \cos(\theta_2 + 2\pi/3) - Iq^* \cdot \sin(\theta_2 + 2\pi/3)\} \quad (7)$$

The value Iw* is calculated by $Iw^* = -(Iu^* + Iv^*)$.

Figure 3D:
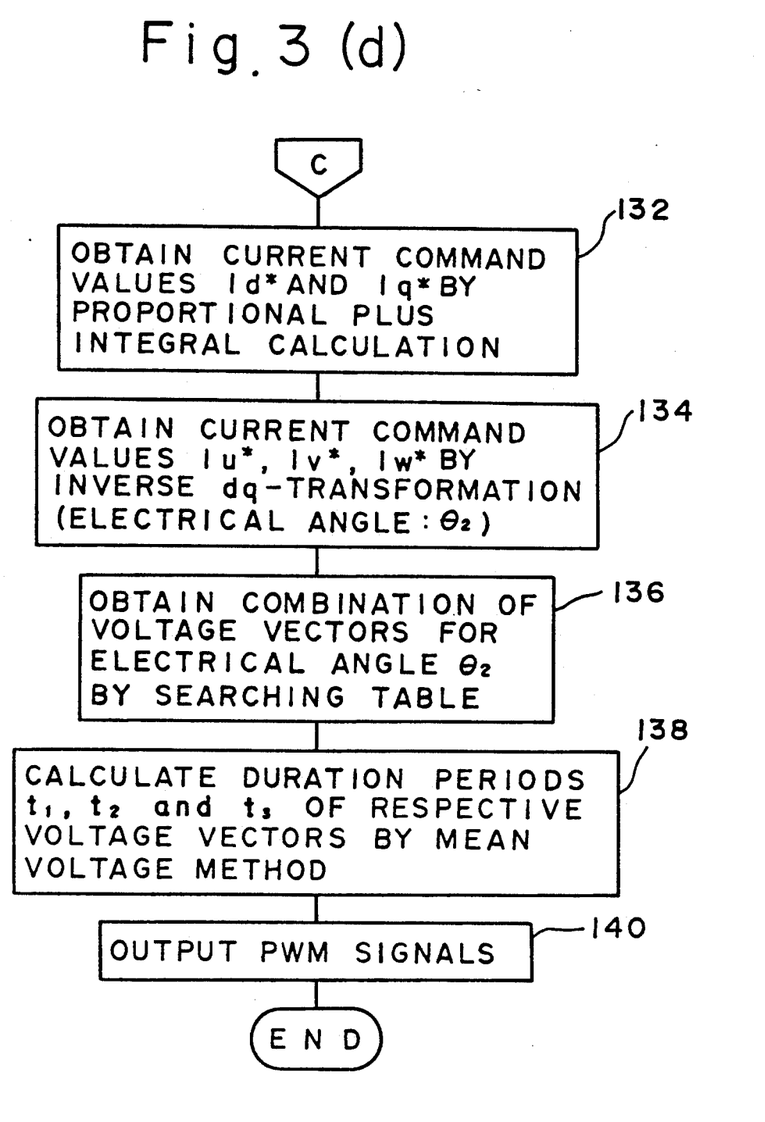

Next, a series of PWM signals in one control period are generated at Steps 136 and 138 by utilization of the level relationship between the current command values Iu*, Iv* and Iw* for the respective phases and a high-frequency triangular wave, that is, by the mean voltage method.

Figure 5:
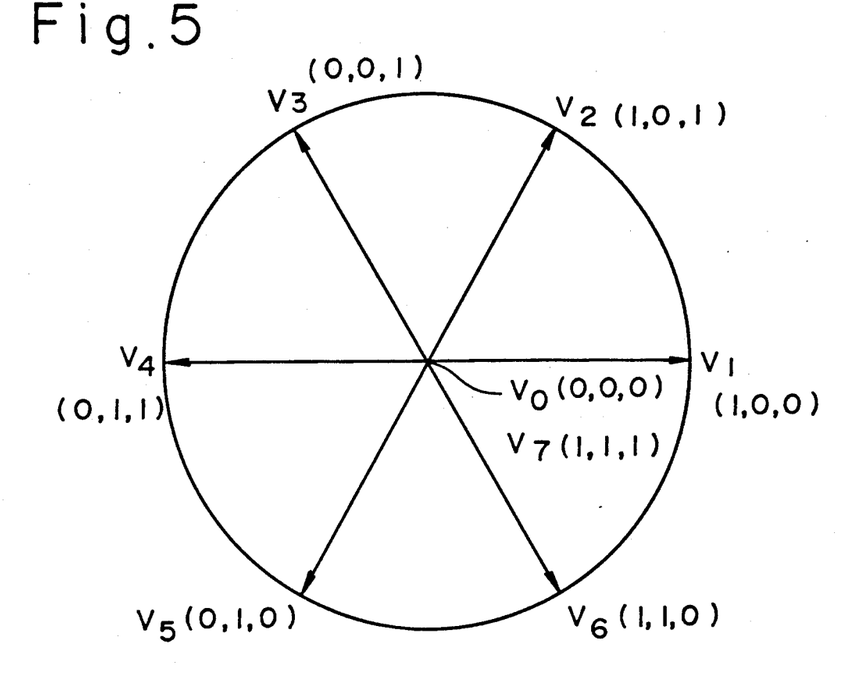
FIG. 5 is a vector diagram showing voltage vectors corresponding to PWM signals.

The series of PWM signals can be expressed in the form of voltage vectors representing voltage application conditions of the respective phases, as shown in FIG. 5. The revolving magnetic field vector can be expressed in the form of an integration of the voltage vectors.

Figure 6:
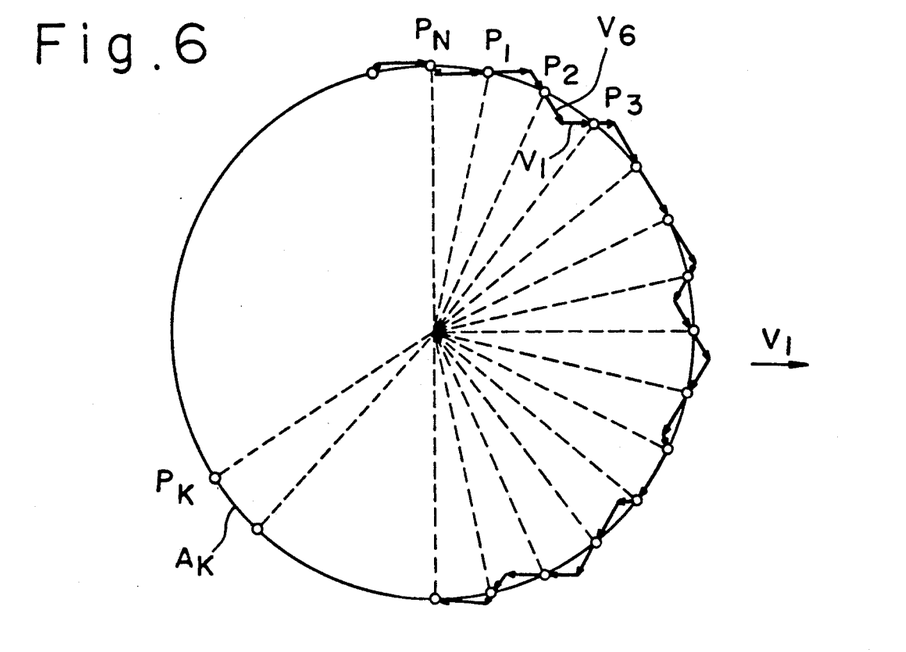
FIG. 6 is a vector diagram showing the relationship between the voltage vectors and the revolving magnetic field.
Figure 7:
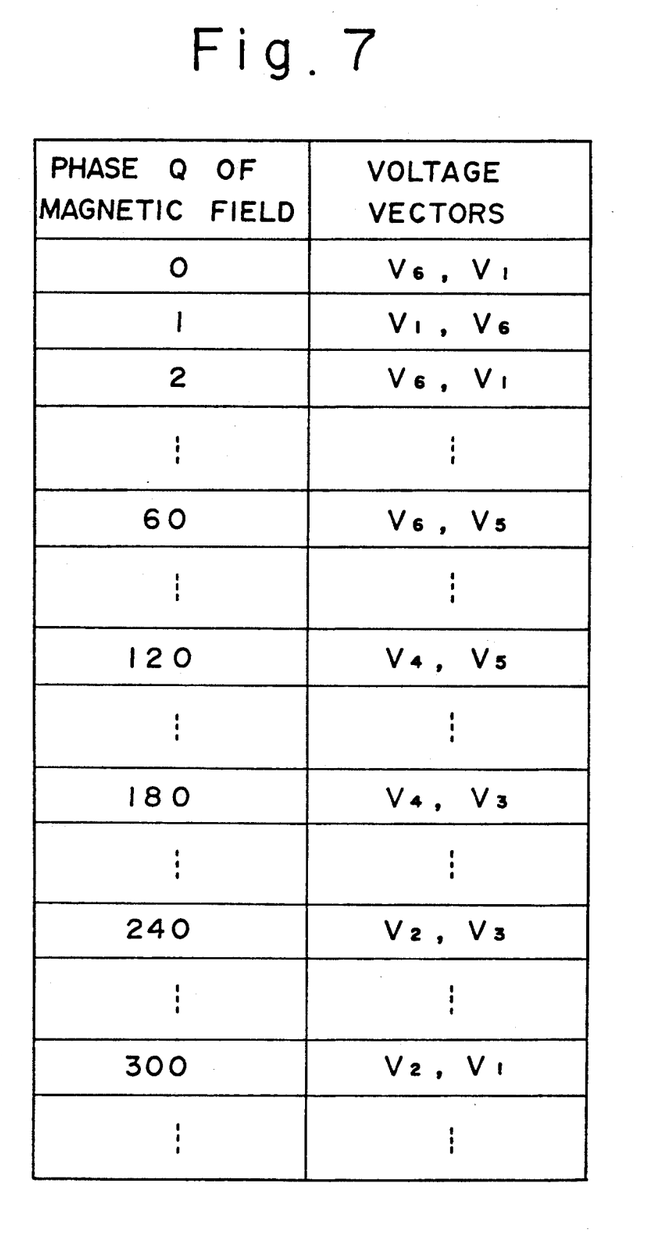
FIG. 7 shows the corresponding relationship between the phase of the revolving magnetic field and the voltage vectors.

Accordingly, the locus of the top end of the revolving magnetic field vector is drawn by the sum of the voltage vectors each multiplied by duration, as shown in FIG. 6. In order to position the revolving magnetic field at a point on the circumference at each angle of $2/\pi/n$ by the shortest path, it is necessary to control the inverter 25 with three vectors, that is, a pair of adjacent voltage vectors and zero vector $V_0$ shown in FIG. 5, for each control period. The combination of three voltage vectors uniquely corresponds to the phase of the revolving magnetic field. A table showing the correspondence between the phase of the revolving magnetic field and the combination of voltage vectors has been stored in the ROM 12 in advance, as shown in FIG. 7. In this case, since the zero vector $V_0$ is always included as one element of a combination, it is only necessary to prepare pairs of voltage vectors.

At Step 136, the above-described table in the ROM 12 is searched on the basis of the electrical angle $\theta_2$ (the phase of the revolving magnetic field) at the time of current control to obtain a combination of voltage vectors at that time.

At Step 138, duration periods $t_1$, $t_2$ and $t_3$ of the voltage vectors are calculated.

Figure 8:
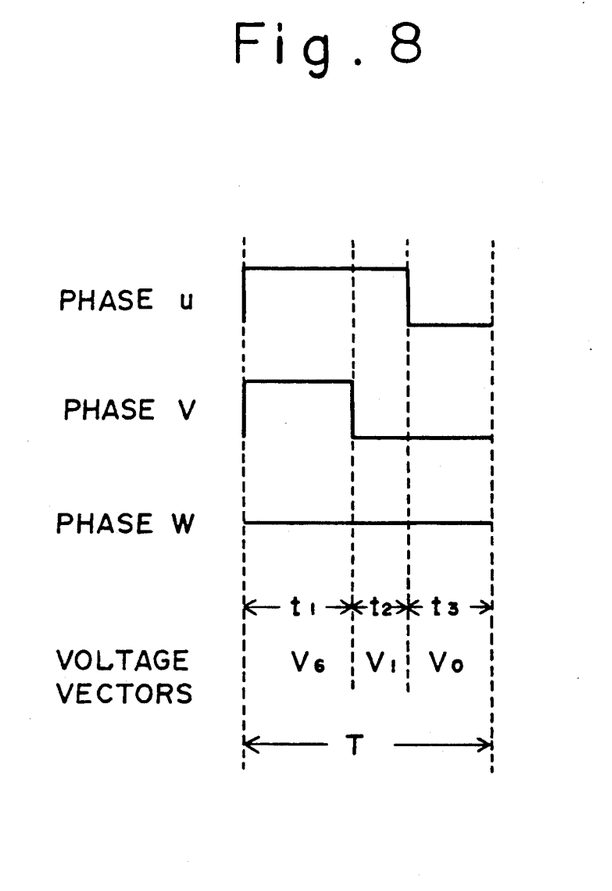
FIG. 8 is a timing chart showing PWM signals.

Assuming that the combination of voltage vectors is $V_6 = (1,1,0)$, $V_1 = (0,0,0)$ and $V_0 = (0,0,0)$, as shown exemplarily in FIG. 8, duration periods $t_1$, $t_2$ and $t_3$ of the voltage vectors are calculated. In this embodiment, the mean voltage method, which is well known, is employed for the calculation.

More specifically, assuming that, among the current command values Iu*, Iv* and Iw* for the respective phases, two current command values whose absolute values are relatively large are represented by $I_1^*$ and $I_2^*$ in descending order of value, duration periods $t_1$, $t_2$ and $t_3$ are obtained by the following equations:

$$t_1 = |2I_2^* + I_1^*| \cdot T/Vdc \quad (8)$$

$$t_2 = |I_1{}^* - I_2{}^*| \cdot T/Vdc \qquad (9)$$

$$t_3 = T - (t_1 + t_2) \qquad (10)$$

where T is period, and Vdc applied DC voltage. Next, at Step 140, PWM signals based on one set of voltage vectors are output for the respective duration periods $t_1$, $t_2$ and $t_3$. For example, $V_6=(1,1,0)$, $V_1=(1,0,0)$ and $V_0=(0,0,0)$ are output in the mentioned order for the respective duration periods $t_1$, $t_2$ and $t_3$, as shown in FIG. 8. In other words, for the phase u the voltage is applied for $t_1+t_2$, for the phase v the voltage is applied for $t_1$, and for the phase w no voltage is applied during the relevant control period.

In this way, the processing of one execution cycle is completed. This execution cycle is executed at a minimum control period. Number of times used as criteria for judgment made in Steps 100, 114 and 124 have been set so that the current feedback loop is controlled at a period which is an integer multiple $n_1$ of the minimum control period, the velocity feedback loop is controlled at a period which is an integer multiple $n_2$ of the period for the current feedback loop, and the position feedback loop is controlled at a period which is an integer multiple $n_3$ of the period for the velocity feedback loop, where $n_1 < n_2 \leq n_3$.

By repeated execution of the above-described cycle, the feedback control for position, velocity and current is executed at the timing shown in FIG. 4.

The timing shown in FIG. 4 is detected by measuring time from the time of execution of the program by the CPU 11.

Thus, the feedforward value is stabilized by being averaged for a predetermined period of time in advance. In addition, since time lag compensation is made, the commanded target position, the feedback value in the position feedback loop and the feedforward value can be synchronized with each other.

According to the present invention, the target position is delayed so that the feedforward value synchronizes with the target position. Accordingly, there is no time lag between the target position, the feedback value representative of the present position and the feedforward value, so that the command velocity to the motor will not change needlessly.

Thus, the feedforward control according to the present invention enables suppression of oscillation of the servo system and hence permits an improvement in the accuracy of the finished configuration of the workpiece.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. A digital servo-control apparatus which controls the rotation of a servomotor on the basis of a digital position command value representative of a target position and a digital position feedback value output from position detecting means, comprising:

means for calculating a feedforward value at intervals of a predetermined period on the basis of the amount of change of said position command value;

means for delaying said position command value by a period of time corresponding to an operation delay in said feedforward value calculating means;

means for calculating a velocity command value by adding said feedforward value to a deviation of said position feedback value from said position command value delayed by said delay means; and means for driving said servomotor according to the velocity command value calculated by said calculating means.

2. A digital servo-control apparatus according to claim 1, wherein said feedforward value calculating means comprises means for calculating at intervals of a predetermined period a mean value of a plurality of feedforward values calculated in a predetermined past time as a smoothed feedforward value, means for sequentially storing smoothed feedforward values obtained by said calculating means, and means for outputting, among the smoothed feedforward values stored in said storage means, the value calculated a predetermined delay time before the present time, and wherein said delay means delays said position command value representative of a target position by a period of time corresponding to said delay time.

3. A digital servo-control apparatus according to claim 2, wherein said servomotor driving means comprises means for calculating a velocity feedback value on the basis of a change of the output of said present position detecting means per unit time, means for calculating a difference between the velocity feedback value calculated by said velocity feedback value calculating means and said velocity command value and outputting it as a current command value, and current control means for controlling the load current to said servomotor on the basis of the current command value output from said output means.

4. A digital servo-control apparatus according to claim 3, wherein said servomotor is an AC servomotor and said current control means comprises means for detecting a load current to said AC servomotor at a predetermined control interval, means for obtaining d- and q-axis components of said detected load current in a dq-coordinate system, said d- and q-axis components representing reactive and active components of said load current, respectively, means for obtaining dq-component command values for controlling said load current in said dq-coordinate system in accordance with respective deviations of said d- and q-axis components of said detected load current to respective target values, and means for inversely transforming said dq-component command values into a current command value for controlling said load current.

* * * * *